(12) United States Patent
Erd et al.

(10) Patent No.: US 9,257,890 B2
(45) Date of Patent: Feb. 9, 2016

(54) PERMANENT MAGNET ROTOR FOR AN ELECTRICAL MACHINE

(75) Inventors: Ludwig Erd, Berlin (DE); Axel Möhle, Berlin (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 398 days.

(21) Appl. No.: 13/821,456

(22) PCT Filed: Aug. 29, 2011

(86) PCT No.: PCT/EP2011/064787
§ 371 (c)(1),
(2), (4) Date: Mar. 7, 2013

(87) PCT Pub. No.: WO2012/031923
PCT Pub. Date: Mar. 15, 2012

(65) Prior Publication Data
US 2013/0270954 A1  Oct. 17, 2013

(30) Foreign Application Priority Data
Sep. 8, 2010 (DE) .......................... 10 2010 040 400

(51) Int. Cl.
*H02K 21/14* (2006.01)
*H02K 1/27* (2006.01)
*H02K 7/18* (2006.01)

(52) U.S. Cl.
CPC ................ *H02K 21/14* (2013.01); *H02K 1/278* (2013.01); *H02K 1/2786* (2013.01); *H02K 7/1838* (2013.01); *H02K 2213/03* (2013.01)

(58) Field of Classification Search
CPC ... H02K 1/278; H02K 1/2786; H02K 7/1838; H02K 21/14; H02K 2213/03

USPC ............. 310/156.08, 156.12, 156.15, 156.19, 310/156.21, 216.055

See application file for complete search history.

(56) References Cited

U.S. PATENT DOCUMENTS

| | | | | |
|---|---|---|---|---|
| 2,060,259 A * | 11/1936 | Spengler | .............. | H02K 1/2726 310/156.61 |
| 4,260,921 A * | 4/1981 | Silver | .................... | H02K 1/278 310/156.19 |
| 4,791,328 A * | 12/1988 | Lakin | ....................... | H02K 1/22 310/156.13 |
| 5,831,365 A | 11/1998 | Dade | | |
| 5,939,809 A * | 8/1999 | Mobius | .................. | H02K 1/278 310/156.13 |
| 6,552,459 B2 * | 4/2003 | Burton | ..................... | H02K 1/28 310/156.08 |
| 7,116,026 B2 * | 10/2006 | Kuwabara | .............. | H02K 15/03 310/154.07 |

(Continued)

FOREIGN PATENT DOCUMENTS

| CN | 1531771 A | 9/2004 |
|---|---|---|
| CN | 101090213 A | 12/2007 |

(Continued)

*Primary Examiner* — John K Kim
(74) *Attorney, Agent, or Firm* — Henry M. Feiereisen LLC (57) ABSTRACT

A rotor for an electrical machine has a rotor body and permanent magnets arranged on the circumference of the rotor body, wherein those areas of the circumference of the rotor body which are covered by the permanent magnets have at least one recess and/or that side of the permanent magnets which faces the circumference of the rotor body has at least one recess. Each recess is configured as a slot which extends in parallel relationship to a circumference-proximal side of the permanent magnets. Removably insertable in the recesses are ferromagnetic bars to allow removal of the permanent magnets.

14 Claims, 8 Drawing Sheets

(56) References Cited

U.S. PATENT DOCUMENTS

| | | | |
|---|---|---|---|
| 8,933,605 B2 * | 1/2015 | Jiang | H02K 1/278 310/156.47 |
| 2002/0135252 A1 | 9/2002 | Burton | |
| 2004/0088852 A1 | 5/2004 | Ogawa et al. | |
| 2007/0290564 A1 | 12/2007 | Clark | |
| 2010/0264758 A1 | 10/2010 | Strohm et al. | |
| 2013/0270954 A1 * | 10/2013 | Erd | H02K 1/278 310/156.08 |

FOREIGN PATENT DOCUMENTS

| | | |
|---|---|---|
| DE | 20 2008 013 303 U1 | 3/2009 |
| EP | 1 427 088 A2 | 6/2004 |
| EP | 1 860 755 A2 | 11/2007 |
| EP | 2 348 619 A1 | 7/2011 |
| JP | 11089141 A | 3/1999 |
| JP | 2004187350 A | 7/2004 |

* cited by examiner

PERMANENT MAGNET ROTOR FOR AN ELECTRICAL MACHINE

CROSS-REFERENCES TO RELATED APPLICATIONS

This application is the U.S. National Stage of International Application No. PCT/EP20111064787, filed Aug. 29, 2011, which designated the United States and has been published as International Publication No. WO 2012/031923 and which claims the priority of German Patent Application, Serial No, 10 2010 040 400.4, filed Sep. 8, 2010, pursuant to 35 U.S.C. 119(a)-(d).

BACKGROUND OF THE INVENTION.

In electrical machines with permanent excitation and permanent magnets arranged at the air gap, the retaining force of the permanent magnets on the rotor body is of decisive importance for the operational reliability of the machine. Previous fixing solutions are based on mechanical connections or adhesive connections. In doing so, the usually flat permanent magnets or magnet systems (comprising a base plate and permanent magnets fixed thereto) are screwed, clamped or glued to the rotor body, as the magnetic retaining forces alone are not sufficient to retain the permanent magnets reliably on the rotor body under all operating conditions.

Figure 1:
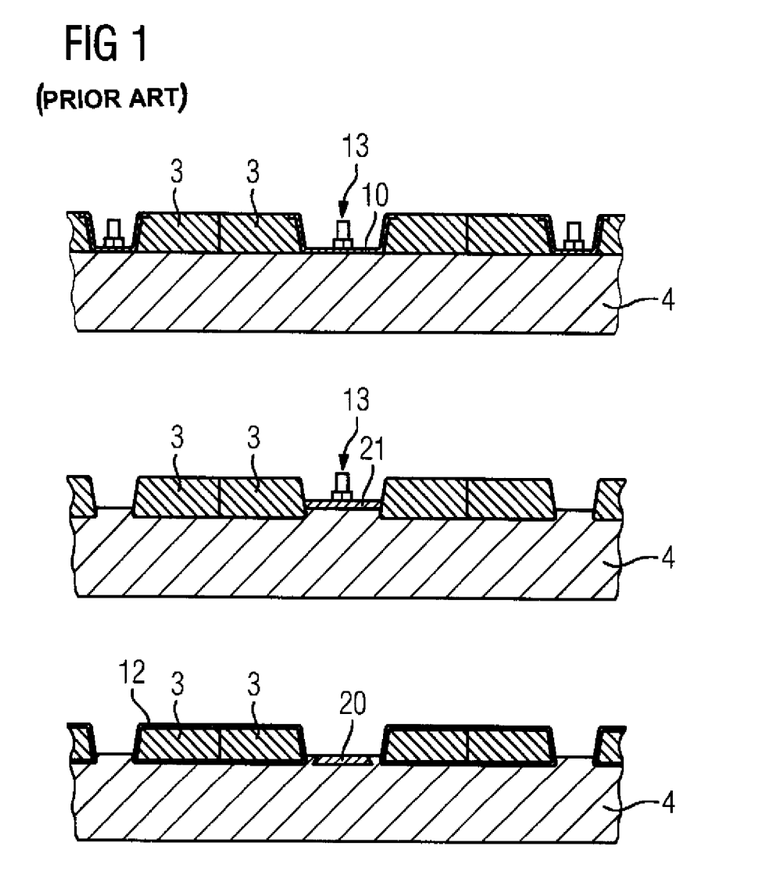
FIG. 1 shows possible fixings disclosed in the prior art for fixing the permanent magnets to the rotor body.

Fixing solutions which have been disclosed in the prior art are shown in FIG. 1. In the top diagram in FIG. 1, the permanent magnets 3 are attached to the rotor body 4 by means of shaped plates 10 and cartridge-fired pins/rivets 13. In the middle diagram in FIG. 1, the permanent magnets 3 are pushed into trapezoidal slots made in the rotor body 4 and in this way fixed to the rotor body 4. At the same time, the permanent magnets are additionally fixed by means of cartridge-fired pins/rivets 13 and the element 21.

In the bottom diagram in FIG. 1, the permanent magnets 3 are embedded in a sleeve 12, wherein the sleeve 12 is attached to the rotor body 4 by means of a dovetail joint. Additional pressure is exerted on the dovetail joint by means of a clamp 20 in order to additionally increase the fixing of the permanent magnets.

SUMMARY OF THE INVENTION

The object of the invention is to create a rotor for an electrical machine with which the permanent magnets are reliably retained on the rotor body of the rotor.

This object is achieved by a rotor for an electrical machine, wherein the rotor has a rotor body, wherein permanent magnets are arranged on the circumference of the rotor body, wherein the areas of the circumference of the rotor body which are covered by the permanent magnets have at least one recess and/or the side of the permanent magnets which faces the circumference of the rotor body has at least one recess, wherein, as a result of the recesses, the contact area with which the permanent magnets rest on the rotor body in each case is between 20% and 85% of the side area of the side of the permanent magnets which faces the circumference of the rotor body.

Advantageous embodiments of the invention can be seen from the dependent claims.

It has been shown to be advantageous when, as a result of the recesses, the contact surface with which the permanent magnets rest on the rotor body in each case is between 45% and 55% of the side area of the side of the permanent magnets which faces the circumference of the rotor body, as a very large increase in the magnetic retaining force is then achieved.

Furthermore, this object is achieved by a rotor for an electrical machine, wherein the rotor has a rotor body, wherein ferromagnetic carrier elements are arranged on the circumference of the rotor body, wherein at least one permanent magnet is arranged on the side of the carrier elements which faces away from the circumference of the rotor body, wherein the side of the carrier elements which faces the circumference of the rotor body has at least one recess and/or the side of the carrier elements which faces away from the circumference of the rotor body has at least one recess.

It has been shown to be advantageous when, as a result of the recesses, the contact surface with which the carrier elements rest on the rotor body in each case is between 20% and 85% of the side surface of the side of the carrier elements which faces the circumference of the rotor body and/or that, as a result of the recesses, the contact surface with which the permanent magnets rest on the carrier elements in each case is between 20% and 85% of the side surface of the side of the carrier elements which faces away from the circumference of the rotor body, as a large increase in the magnetic retaining force is then achieved.

Furthermore, it has been shown to be advantageous when, as a result of the recesses, the contact surface with which the carrier elements rest on the rotor body in each case is between 45% and 55% of the side surface of the side of the carrier elements which faces the circumference of the rotor body and/or when, as a result of the recesses, the contact surface with which the permanent magnets rest on the carrier elements in each case is between 45% and 55% of the side surface of the side of the carrier elements which faces away from the circumference of the rotor body, as a very large increase in the magnetic retaining force is then achieved.

Furthermore, it has shown to be advantageous when the recess is realized in the form of a slot, wherein the direction of the slot runs parallel to the side of the permanent magnets which faces the circumference of the rotor body. This enables the permanent magnets to be easily removed.

Furthermore, it has been shown to be advantageous when the slot has a square, rectangular, round, trapezoidal or V-shaped form, as these forms of the slot can be easily realized.

At the same time, the electrical machine which has the rotor can be designed as an electric motor or generator and, in particular, a wind turbine generator. It preferably has an electrical power which is greater than 1 MW. The generator is used to generate electrical energy. At the same time, the wind turbine generator can in particular be designed as a directly driven wind turbine generator.

BRIEF DESCRIPTION OF THE DRAWING

Several exemplary embodiments of the invention are shown in the drawing and are explained in more detail below. In the drawing.

DETAILED DESCRIPTION OF PREFERRED EMBODIMENTS

Figure 2:
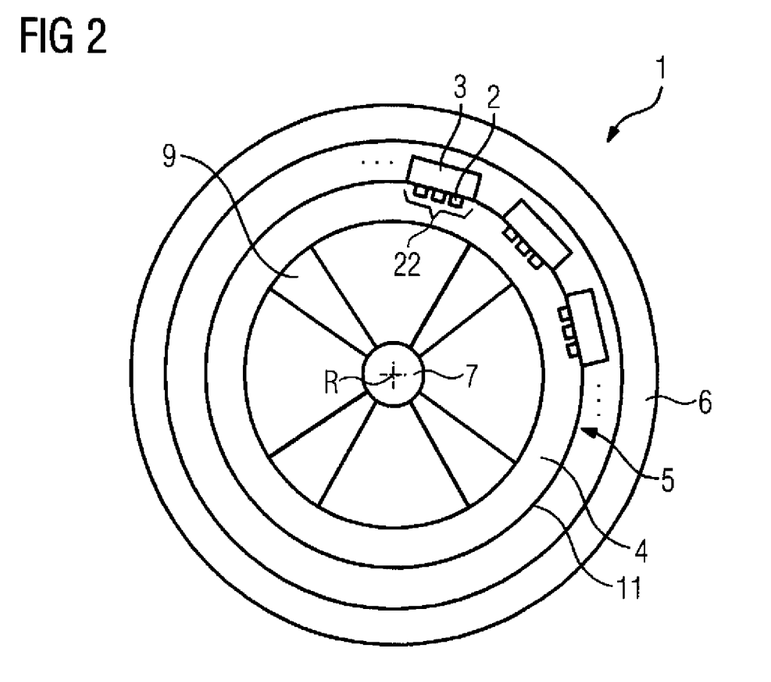
FIG. 2 shows an electrical machine in the form of a schematic diagram.

An electrical machine 1 is shown in FIG. 2 in the form of a schematic diagram. The electrical machine 1 has a rotor 5 which is rotatably arranged about an axis of rotation R. The rotor has a rotor body 4 which is connected to a shaft 7 by means of connecting elements 9. In doing so, the rotor body can be solid or can be in the form of plates which are arranged successively in the direction of the axis of rotation R of the rotor 5. Furthermore, the rotor body can also be segmented. The rotor comprises all elements of the machine which are rotatably arranged about the axis of rotation R of the rotor 5.

Permanent magnets are arranged on the circumference 11 of the rotor body 4, wherein only one permanent magnet 3 is assigned a reference for reasons of clarity. At the same time, the permanent magnets are arranged around the whole circumference 11 of the rotor body 4, which is shown by dots in FIG. 2. The permanent magnets run in the direction of the axis of rotation R. The areas of the circumference 11 of the rotor body 4 covered by the permanent magnets have recesses, wherein only one recess 2 and only one of the areas 22 covered by the permanent magnet 3 are assigned a reference in FIG. 2 for reasons of clarity. The recesses run into the rotor body.

It is to be noted at this point that, with all the exemplary embodiments of the invention described within the framework of the present application, the recesses are realized in the form of slots running in the direction of the axis of rotation R of the rotor, which does not necessarily have to be the case. For example, the recesses can also be provided in the form of holes or otherwise formed recesses which are made in the circumference of the rotor body 4. The slots run in the direction of the respective slot parallel to the side of the permanent magnets which faces the circumference of the rotor body. The slots can therefore, for example, also run in a tangential direction with respect to the circumference of the rotor body. At the same time, the slots can have a square, rectangular, round, trapezoidal or V-shaped form for example.

Figure 14:
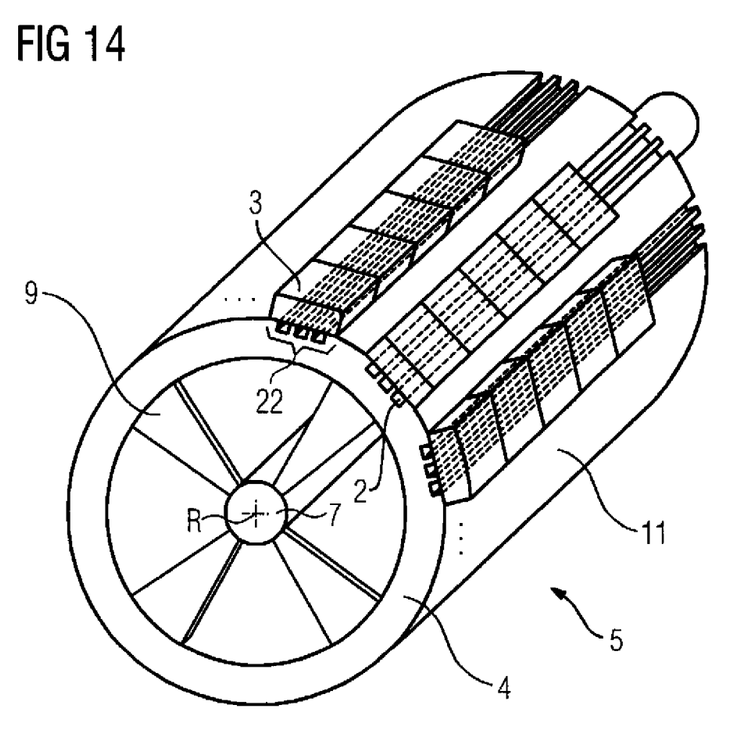
FIG. 14 shows a perspective view of the rotor shown in FIG. 2 in the form of a schematic diagram.

The rotor 5 shown in FIG. 2 is shown in a schematic perspective view in FIG. 14, wherein, in FIG. 14, only one of the permanent magnets which are arranged successively in the direction of the axis of rotation R is assigned the reference 3 for reasons of clarity. As the rotor 5 of the electrical machine 1 has permanent magnets, the electrical machine 1 is a so-called permanent-magnet excited electrical machine. An air gap is provided between the rotor 5 and the stator 6 of the electrical machine 1. It is to be noted at this point that the electrical coils of the stator 6 are not shown in FIG. 2 for reasons of clarity and because they are not important for understanding the invention. Within the scope of the exemplary embodiment shown in FIG. 2, the electrical machine 1 is designed as a so-called internal rotor machine, i.e. the round stator 6 is arranged around the rotor 5 which is rotatably arranged in the centre of the electrical machine 1.

Figure 3:
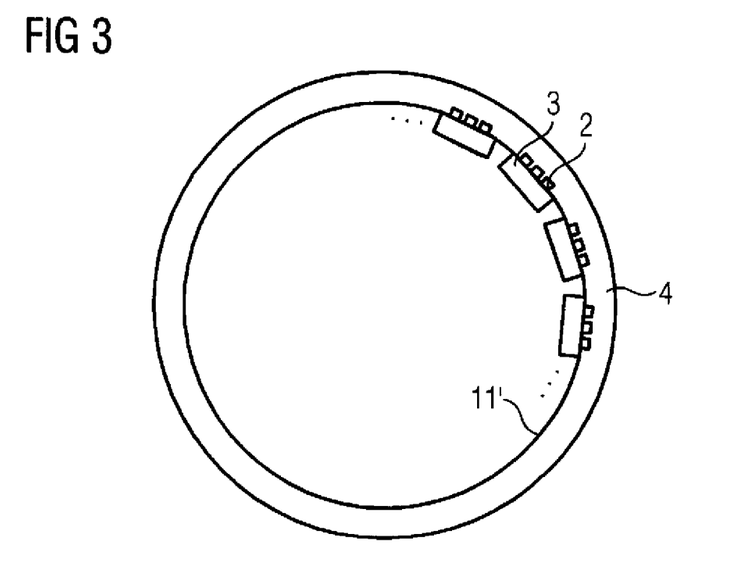
FIG. 3 shows an alternative design of the rotor according to the invention of the electrical machine shown in FIG. 2 in the form of a schematic diagram.

However, as shown in FIG. 3, the electrical machine 1 can also be designed as a so-called external rotor machine, i.e., when the machine operates, the rotor rotates around the stator of the machine which is arranged at rest in the centre of the machine. For reasons of clarity, only the rotor body 4 with the permanent magnets arranged therein is shown in FIG. 3 for a design of the electrical machine 1 as an external rotor machine, wherein identical elements are assigned the same references as in FIG. 2.

In a design of the electrical machine as an internal rotor machine shown in FIG. 2, the permanent magnets are arranged on the outer circumference 11 of the rotor body 4, while in a design of the electrical machine as an external rotor machine shown in FIG. 3, the permanent magnets are arranged on the inner circumference 11' of the rotor body 4 and the areas of the inner circumference 11' of the rotor body 4 covered by the permanent magnets have recesses, of which only one recess 2 is assigned a reference for reasons of clarity.

The circumference of the rotor body can therefore be provided in the form of the external circumference 11 of the rotor body and also in the form of the internal circumference 11' of the rotor body.

At the same time, within the scope of the exemplary embodiments, the areas of the circumference 11 or 11' covered by the permanent magnets have a flat surface. This can be produced, for example, by machining the rotor body, e.g. by means of a milling cutter.

It is to be noted at this point that the rotor body 4 can be solid or can include plates which are arranged successively in the direction of the axis of rotation R of the rotor 5. Furthermore, the rotor body 4 can also be segmented. The rotor body is made of a ferromagnetic material, such as a ferromagnetic iron alloy for example.

Figure 4:
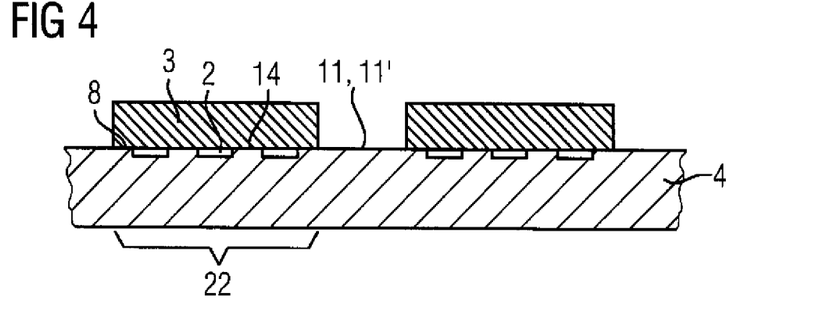
FIG. 4 shows a schematic detail view of a design of the invention.

A section of the rotor body 4 with the permanent magnets which are arranged on its circumference 11 or 11' is shown unrolled in one plane in FIG. 4 in the form of a schematic sectional view. In doing so, identical elements are assigned the same references in FIG. 4 as in FIG. 2 and FIG. 3. The areas of the circumference of the rotor body which are covered by the permanent magnets have recesses. The recesses are arranged between the permanent magnets and the axis of rotation R. The recesses are made in the circumferential surface of the rotor body 4. The recesses run into the rotor body. The side of the permanent magnets which faces the circumference 11 or 11' of the rotor body 4 is assigned the reference 8 in FIG. 4.

Figure 15:
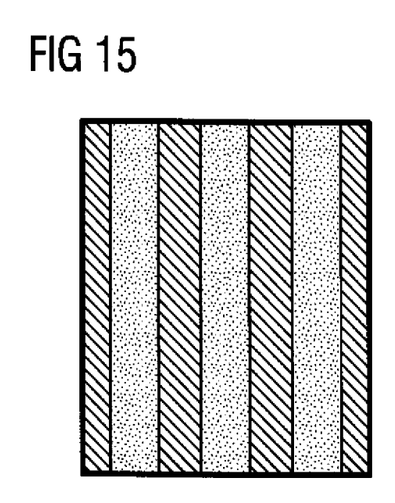
FIG. 15 shows the side area of the side of the permanent magnets which faces the circumference of the rotor body.

The recesses have a higher magnetic resistance than the rest of the areas of the circumference 11 or 11' covered by the permanent magnets. As a result, the magnetic flux spreads onto the contact surfaces on which the permanent magnets rest on the surface of the rotor body 4, i.e., referred to FIG. 4, the magnetic flux runs substantially to the left and right of the respective recesses. Only the contact area 14 is assigned a reference in FIG. 4 for reasons of clarity. As the magnetic retaining force with which the permanent magnets stick to the ferromagnetic rotor body 4 increases quadratically with the magnetic flux density, the magnetic retaining force increases significantly in spite of reduced effective contact area of the permanent magnets. As a result of this marked increase in the retaining force, additional mechanical fixing solutions, such as, for example, those described in the introduction and shown in FIG. 1, can be dispensed with, as a result of which assembly and manufacture of the rotor is significantly simplified. The magnetic retaining forces are therefore greatly increased compared with the prior art by the implementation according to the invention of recesses between the permanent magnets and the rotor body 4, so that the magnetic connection between the permanent magnets and the rotor body is markedly increased and therefore improved compared with the prior art. At the same time, the recesses have such a size that, as a result of the recesses, the contact area with which the permanent magnets rest on the rotor body 4 in each case is between 20% and 85% of the side area of the side 8 of the permanent magnets which faces the circumference 11 or 11' of the rotor body 4. A particularly high increase in the retaining force results when the recesses have such a size that, as a result of the recesses, the contact area with which the permanent magnets rest on the rotor body 4 in each case is between 45% and 55% of the side area of the side 8 of the permanent magnets which faces the circumference 11 or 11' of the rotor body 4. The side surface of the side 8 of the permanent magnets 3 which faces the circumference 11 or 11' of the rotor body 4 is shown in FIG. 15 in a schematic view. The side surface is the surface outlined by the thick rectangle. As a result of the recesses on the side of the rotor body and/or on the side of the permanent magnets, the surfaces of the side surface shown dotted in FIG. 15 are no longer available as contact surfaces. The contact surface corresponds to the side surface minus the surfaces which are shown dotted. The contact surface is shown hatched in FIG. 15.

Figure 5:
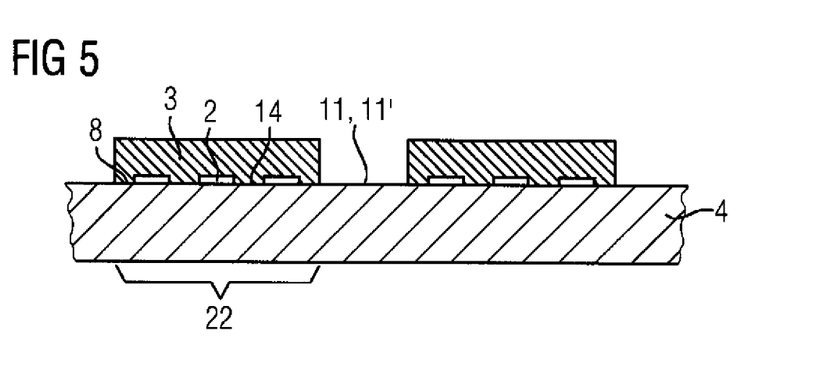
FIG. 5 shows a schematic detail view of a further design of the invention.

A further exemplary embodiment of the invention is shown in FIG. 5, wherein identical elements are assigned the same references as in FIG. 4. In the exemplary embodiment shown in FIG. 5, the recesses are not made in the circumference 11 or 11' of the rotor body 4 as in FIG. 4; instead the side 8 of the permanent magnets which faces the circumference 11 or 11' of the rotor body 4 has the recesses. In doing so, the recesses run into the permanent magnets. Otherwise, the principle of operation is the same as the principle of operation shown in FIG. 4, so that the magnetic retaining forces are also greatly increased in this embodiment of the invention compared with an embodiment of the permanent magnets which has no recesses. As already stated, the recesses have such a size that, as a result of the recesses, the contact area with which the permanent magnets rest on the rotor body 4 in each case is between 20% and 85% of the side area of the side 8 of the permanent magnets which faces the circumference 11 or 11' of the rotor body 4. A particularly high increase in the retaining force results as already stated, when the recesses have such a size that, as a result of the recesses, the contact area with which the permanent magnets rest on the rotor body 4 in each case is between 45% and 55% of the side area of the side 8 of the permanent magnets which faces the circumference 11 or 11' of the rotor body 4.

Furthermore, it is to be noted at this point that, with regard to the above-mentioned designs of the invention, the invention can also be designed in such a way that both the areas of the circumference of the rotor body covered by the permanent magnets and also the side of the permanent magnets which faces the circumference of the rotor body have recesses. As already stated, the recesses have such a size that, as a result of the recesses, the contact area with which the permanent magnets rest on the rotor body 4 in each case is between 20% and 85% of the side area of the side 8 of the permanent magnets which faces the circumference 11 or 11' of the rotor body 4. A particularly high increase in the retaining force results as already stated, when the recesses have such a size that, as a result of the recesses, the contact area with which the permanent magnets rest on the rotor body 4 in each case is between 45% and 55% of the side area of the side 8 of the permanent magnets which faces the circumference 11 or 11' of the rotor body 4.

Further, it is to be noted at this point that the areas of the circumference of the rotor body covered by the permanent magnets can also have only a single recess and/or the side of the permanent magnets which faces the circumference of the rotor body can also have only a single recess.

Figure 6:
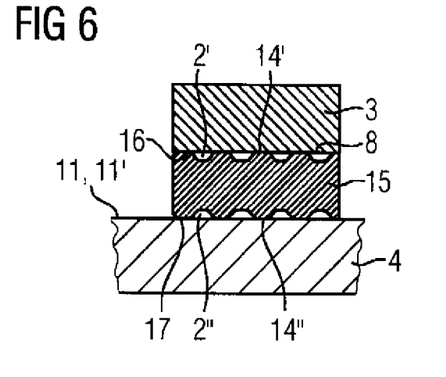
FIG. 6 shows a schematic detail view of a further design of the invention.
Figure 12:
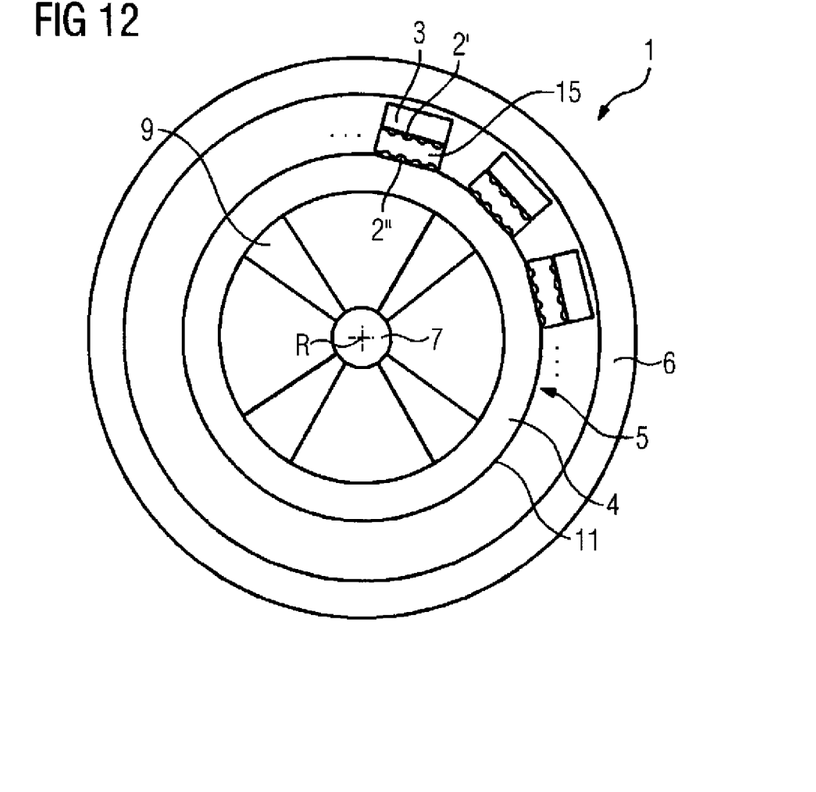
FIG. 12 shows a further electrical machine in the form of a schematic diagram.
Figure 13:
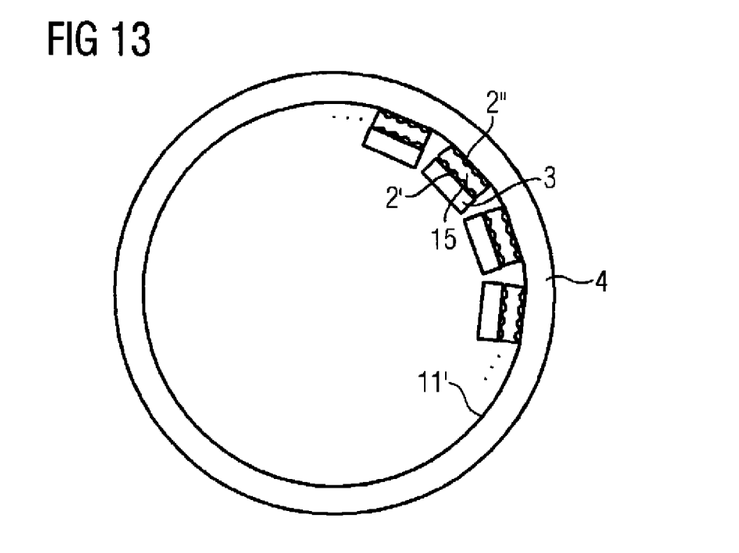
FIG. 13 shows an alternative design of the rotor according to the invention of the electrical machine shown in FIG. 12 in the form of a schematic diagram.

A further design of the invention is shown in FIG. 6, FIG. 12 and FIG. 13, wherein identical elements in the figures are assigned the same references as in FIG. 2 and FIG. 3. As shown in FIG. 13, in this design of the invention as in all other designs of the invention, the machine 1 can also be designed as an external rotor machine. The fitting of the permanent magnets to the rotor body 4 shown in FIG. 12 and FIG. 13 using the permanent magnet 3 as an example is shown in FIG. 6 in the form of a schematic sectional view. In this embodiment of the invention, the permanent magnets are attached to the rotor body 4 by means of ferromagnetic carrier elements, wherein only one carrier element 15 is assigned a reference in FIG. 12 and FIG. 13. The ferromagnetic carrier elements are arranged between the permanent magnets and the rotor body 4, wherein a single or a plurality of permanent magnets are arranged on the side 16 of the carrier elements which faces away from the circumference 11 or 11' of the rotor body 4, wherein the side 17 of the carrier elements which faces the circumference 11 or 11' of the rotor body 4 has recesses and the side 16 of the carrier elements which faces away from the circumference 11 or 11' of the rotor 4 has recesses. The recesses run into the carrier elements. In FIG. 6, only the recesses 2' and 2" are assigned references for reasons of clarity. At the same time, as in the other exemplary embodiments, within the scope of the exemplary embodiments, the recesses are realized in the form of slots which run parallel to the side 8 of the permanent magnets which faces the circumference of the rotor body 4. The slots can have a square, rectangular, round, trapezoidal or V-shaped form, for example, and preferably run in the direction of the axis of rotation R of the rotor or through the carrier elements in a tangential direction with respect to the circumference 11 or 11' of the rotor body.

In doing so, the principle of operation is again the same as described for the previous exemplary embodiments. As a result of the recesses provided, the magnetic flux produced by the permanent magnet 3 spreads onto the remaining contact areas on which the permanent magnet 3 rests on the carrier element 15 and on which the carrier element 15 rests on the rotor body 4 and runs mainly in these areas. In FIG. 6, only the two contact areas 14' and 14" are assigned references for reasons of clarity. As a result, the magnetic retaining forces, i.e. magnetic attraction forces, acting between the permanent magnet 3 and the carrier element 15 and between the carrier element 15 and the rotor body 4 are significantly increased.

Figure 7:
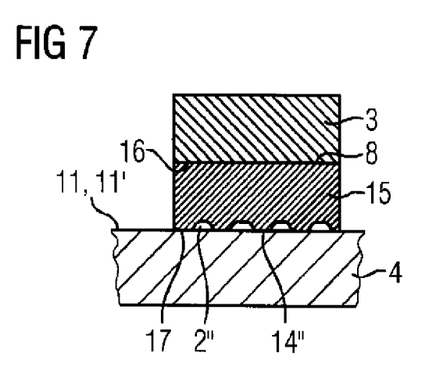
FIG. 7 shows a schematic detail view of a further design of the invention.
Figure 9:
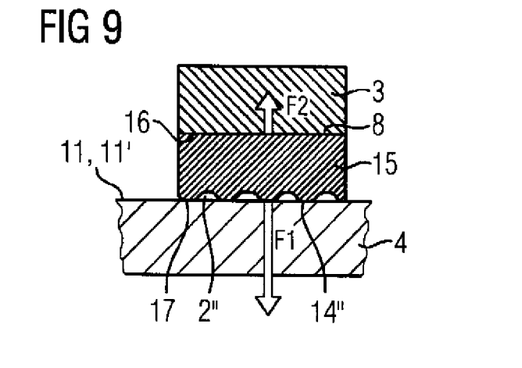
FIG. 9 shows a diagram of the forces which occur.

A further design of the invention, which represents a variant of the design of the invention according to FIG. 6, is shown in FIG. 7. Identical elements are assigned the same references in FIG. 7 as in FIG. 6. In the design of the invention according to FIG. 7, the recesses are only provided on the side 17 of the carrier elements which faces the rotor body 4. The magnetic retaining forces F1 and F2 associated with the design of the invention according to FIG. 7 are shown in FIG. 9. The permanent magnet 3 attracts the ferromagnetic carrier element 15 with the retaining force F2, while the ferromagnetic carrier element 15 is retained on the rotor body 4 with a substantially larger magnetic retaining force F1 compared with the retaining force F2. The force ratio F1 to F2 can be specifically influenced by appropriate variation of the number and design of the recesses.

Figure 8:
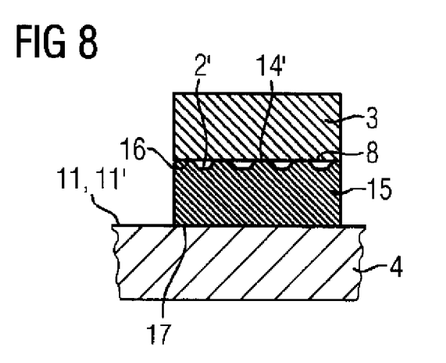
FIG. 8 shows a schematic detail view of a further design of the invention.

A further design of the invention, which represents a further variant of the design of the invention according to FIG. 6, is shown in FIG. 8. Identical elements are assigned the same references in FIG. 8 as in FIG. 6. In the design of the invention according to FIG. 8, the recesses are only provided on the side 16 of the carrier elements which faces away from the rotor body 4.

It is to be noted at this point that the side of the carrier elements which faces the circumference of the rotor body can also have a single recess and/or the side of the carrier elements which faces away from the circumference of the rotor body can also have only a single recess.

Figure 10:
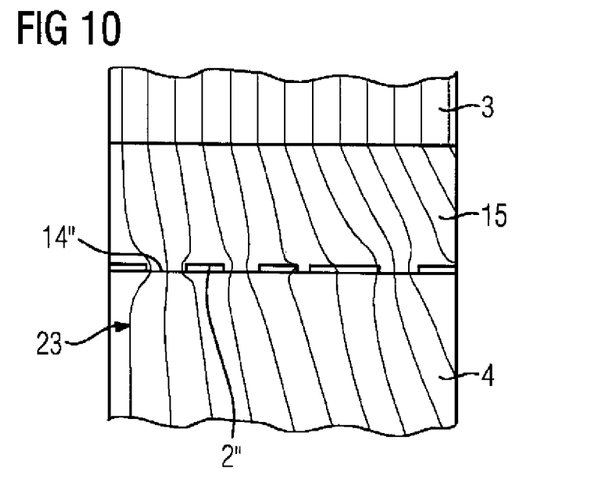
FIG. 10 shows a field pattern.

A magnetic field pattern of the magnetic field lines 23 which form in the case of the exemplary embodiment according to FIG. 7 is shown in FIG. 10. Identical elements are assigned the same references in FIG. 10 as in FIG. 7. As can be clearly seen, the magnetic field lines 23 run substantially on the contact surfaces which occur between the carrier element 15 and the rotor body 4 and run to only a small extent through the recesses, as the magnetic resistance in the recesses is greatly increased.

Figure 16:
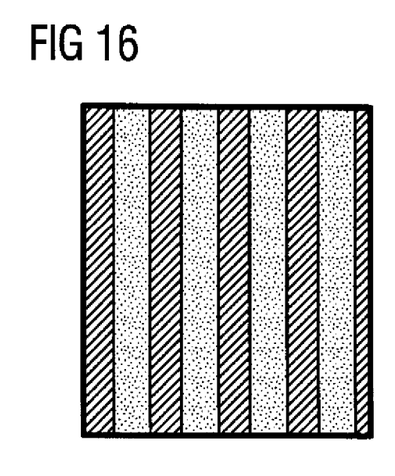
FIG. 16 shows the side area of the side of the carrier elements which faces or faces away from the circumference of the rotor body.

In the designs of the invention according to FIG. 6 to FIG. 10 and FIG. 12 and FIG. 13, the recesses are arranged between the permanent magnets and the rotor body 4. Furthermore, at the same time, the recesses preferably have such a size that, as a result of the recesses, the contact area with which the carrier elements 15 rest on the rotor body 4 in each case is between 20% and 85% of the side area of the side 17 of the carrier elements 15 which faces the circumference 11 or 11' of the rotor body 4 and/or have such a size that, as a result of the recesses, the contact area with which the permanent magnets 3 rest on the carrier elements 15 in each case is between 20% and 85% of the side area of the side 16 of the carrier elements which faces away from the circumference 11 or 11' of the rotor body 4. A particularly large increase in the magnetic retaining force is achieved when the recesses have such a size that, as a result of the recesses, the contact area with which the carrier elements 15 rest on the rotor body 4 in each case is between 45% and 55% of the side area of the side 17 of the carrier elements 15 which faces the circumference 11 or 11' of the rotor body 4 and/or have such a size that, as a result of the recesses, the contact area with which the permanent magnets 3 rest on the carrier elements 15 in each case is between 45% and 55% of the side area of the side 16 of the carrier elements which faces away from the circumference 11 or 11' of the rotor body 4. The side surface of the side of the carrier elements which faces or faces away from the circumference of the rotor body is shown in FIG. 16 in a schematic view. The side surface is the surface outlined by the thick rectangle. As a result of the recesses, the surfaces of the side surface shown dotted in FIG. 16 are no longer available as contact surfaces. The contact surface corresponds to the side surface minus the surfaces which are shown dotted. The contact surface is shown hatched in FIG. 16.

As a result of the realization according to the invention of the recesses, a large increase in the magnetic retaining forces is achieved compared with flat continuous contact surfaces, thus enabling mechanical fixing means disclosed in the prior art, with which the permanent magnets are fixed to the rotor body by means of screws, slots and positively locking connections for example, to be dispensed with. The permanent magnets are therefore attached to the rotor body 4 exclusively by the magnetic retaining forces produced thereby and, in this way, are retained on the rotor body 4 exclusively by the magnetic retaining forces produced thereby.

When the described ferromagnetic carrier elements are used, the magnetic retaining forces are at the same time reinforced by the carrier elements. The carrier elements can be made from a ferromagnetic iron alloy for example.

Figure 11:
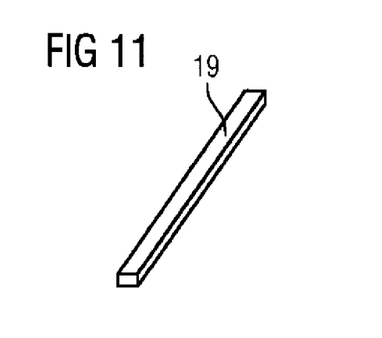
FIG. 11 shows a ferromagnetic bar.

Particularly when the recesses are designed in the form of slots, the invention enables the permanent magnets to be easily removed at a later date, e.g. for maintenance purposes. To achieve this, it is only necessary for ferromagnetic bars, i.e. bars which are made of a ferromagnetic material, such as a ferromagnetic iron alloy for example, to be inserted temporarily into the slots for removal purposes. Such a bar 19 is shown by way of example in FIG. 11. Here, the external form of the bar 19 is matched to the form of the slot and to the channels formed by the slot and by the surface of the permanent magnets or of the rotor body, in particular matched in an interlocking manner. When the bars are inserted into the slots, the magnetic resistance in the slots reduces, as a result of which the magnetic flux is partially redistributed into the slots filled by the bars. The magnetic retaining forces which occur are then equal once more to the magnetic retaining forces which would occur at a flat continuous contact surface between the elements. As already stated, the magnetic retaining forces between the respective attracting elements (permanent magnets, carrier elements, rotor body) reduce significantly due to the magnetic flux which is now uniformly distributed once more so that the permanent magnets and/or the carrier elements can be easily and quickly released with simple means such as wedges for example. At the same time, a plurality of bars, for example, can be connected to form a slider so that the permanent magnets can be released easily and quickly from the rotor body by sliding the slider into the slots.

If the magnetic retaining forces (attracting forces) produced by the permanent magnets should not be sufficient to ensure a reliable retention of the permanent magnets on the rotor body, the retaining forces can be additionally increased in that an adhesive film is applied to the contact surfaces between the permanent magnets and the rotor body or between the permanent magnets and the carrier elements and/or between the carrier elements and the rotor body so that the permanent magnets are retained on the rotor body by means of an adhesive connection in addition to the magnetic retaining connection. In this case, the permanent magnets are retained on the rotor body exclusively by means of magnetic retaining forces and by adhesive forces produced by the adhesive.

It is to be noted at this point, that it is also possible however, in addition to the magnetic connection and any adhesive connection that may be present, to fix the permanent magnets to the rotor body with additional mechanical fixing means in order to thus ensure an extremely reliable retention of the permanent magnets on the rotor body.

Further, it is to be noted at this point that the electrical machine preferably has an electrical power which is greater than 1 MW.

Furthermore, it is to be noted that the side of the permanent magnets which faces the circumference of the rotor body or the side of the carrier elements which faces and/or faces away from the circumference of the rotor body does not necessarily have to be flat as shown in the exemplary embodiments but can also be curved, e.g. by appropriate curvature of the circumference.

Furthermore, it is to be noted that the permanent magnets do not necessarily have to be designed in one piece but that they can also be provided in the form of a plurality of permanent magnets which are joined to form a larger permanent magnet. In FIG. 14, a plurality of permanent magnets are arranged successively in the direction of the axis of rotation R and form such a larger permanent magnet. Furthermore, the permanent magnets can also be arranged next to one another in parallel (e.g. as shown in FIG. 1).

What is claimed is:

1. A rotor for an electrical machine, comprising:
a rotor body;
a permanent magnet arranged on a circumference of the rotor body to thereby cover an area on the circumference of the rotor body, said area having at least one recess formed at least in one of the rotor body and a circumference-proximal side of the permanent magnet so as to define between the permanent magnet and the rotor body a contact area which is between 20% and 85% of a surface area of the circumference-proximal side of the permanent magnet, said recess configured as a slot which extends in parallel relationship to the circumference-proximal side of the permanent magnet; and
a ferromagnetic bar removably insertable in the recess to allow removal of the permanent magnet.

2. The rotor of claim 1, wherein the contact surface is between 45% and 55% of the surface area of the circumference-proximal side of the permanent magnet.

3. The rotor of claim 1, wherein the slot has a square, rectangular, round, trapezoidal or V-shaped form.

4. A rotor for an electrical machine, comprising:
a rotor body;
a ferromagnetic carrier element arranged on a circumference of the rotor body, said ferromagnetic carrier element having a circumference-distal side and a circumference-proximal side;
a permanent magnet arranged on the circumference-distal side of the carrier elements, at least one of the circumference-proximal side and the circumference-distal side of the carrier element having at least one recess so as to define between the carrier element and the rotor body a contact surface which is between 20% and 85% of a surface area of the circumference-proximal side of the carrier element, or to define between the carrier element and the permanent magnet a contact surface which is between 20% and 85% of a surface area of the circumference-distal side of the carrier element; said recess configured as a slot which extends in parallel relationship to a circumference-proximal side of the permanent magnet; and
a ferromagnetic bar removably insertable in the recesses to allow removal of the permanent magnet.

5. The rotor of claim 4, wherein the contact surface between the carrier element and the rotor body is between 45% and 55% of the surface area of the circumference-proximal side of the carrier element, or the contact surface between the permanent magnet and the carrier element is between 45% and 55% of the surface area of the circumference-distal side of the carrier element.

6. The rotor of claim 4, wherein the slot has a square, rectangular, round, trapezoidal or V-shaped form.

7. An electrical machine, constructed in the form of an electric motor or generator, said electrical machine comprising a rotor which includes a rotor body, a permanent magnet arranged on a circumference of the rotor body to thereby cover an area on the circumference of the rotor body, said area having at least one recess formed at least in one of the rotor body and a circumference-proximal side of the permanent magnet so as to define between the permanent magnet and the rotor body a contact area which is between 20% and 85% of a surface area of the circumference-proximal side of the permanent magnet, said recess configured as a slot which extends in parallel relationship to the circumference-proximal side of the permanent magnet, and a ferromagnetic bar removably insertable in the recess to allow removal of the permanent magnet.

8. The electrical machine of claim 7, wherein the contact surface is between 45% and 55% of the surface area of the circumference-proximal side of the permanent magnet.

9. The electrical machine of claim 7, wherein the slot has a square, rectangular, round, trapezoidal or V-shaped form.

10. The electrical machine of claim 7, wherein the generator is configured as a wind turbine generator.

11. An electrical machine, constructed in the form of an electric motor or generator, said electrical machine comprising a rotor which includes a rotor body, a ferromagnetic carrier element arranged on a circumference of the rotor body, said ferromagnetic carrier element having a circumference-distal side and a circumference-proximal side, a permanent magnet arranged on the circumference-distal side of the carrier elements, at least one of the circumference-proximal side and the circumference-distal side of the carrier element having at least one recess so as to define between the carrier element and the rotor body a contact surface which is between 20% and 85% of a surface area of the circumference-proximal side of the carrier element, or to define between the carrier element and the permanent magnet a contact surface which is between 20% and 85% of a surface area of the circumference-distal side of the carrier element; said recess configured as a slot which extends in parallel relationship to a circumference-proximal side of the permanent magnet, and a ferromagnetic bar removably insertable in the recesses to allow removal of the permanent magnet.

12. The rotor of claim 11, wherein the contact surface between the carrier element and the rotor body is between 45% and 55% of the surface area of the circumference-proximal side of the carrier element, or the contact surface between the permanent magnet and the carrier element is between 45% and 55% of the surface area of the circumference-distal side of the carrier element.

13. The electrical machine of claim 11, wherein the slot has a square, rectangular, round, trapezoidal or V-shaped form.

14. The electrical machine of claim 11, wherein the generator is configured as a wind turbine generator.

* * * * *